United States Patent
Zhang et al.

(10) Patent No.: US 11,574,572 B2
(45) Date of Patent: *Feb. 7, 2023

(54) DISPLAY PANEL HAVING SPECIAL-SHAPED AREA AND DISPLAY DEVICE

(71) Applicant: Xiamen Tianma Micro-Electronics Co., Ltd., Xiamen (CN)

(72) Inventors: Mengzi Zhang, Xiamen (CN); Fan Guo, Xiamen (CN); Junjun Gan, Xiamen (CN); Huangyao Wu, Xiamen (CN); Shumao Wu, Xiamen (CN); Guochang Lai, Xiamen (CN); Xiufeng Zhou, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/381,740

(22) Filed: Jul. 21, 2021

(65) Prior Publication Data

US 2021/0398466 A1    Dec. 23, 2021

Related U.S. Application Data

(63) Continuation of application No. 16/589,644, filed on Oct. 1, 2019, now Pat. No. 11,100,832.

(30) Foreign Application Priority Data

Oct. 26, 2018    (CN) .......................... 201811258683.5

(51) Int. Cl.
G09G 3/14        (2006.01)

(52) U.S. Cl.
CPC ....... *G09G 3/14* (2013.01); *G09G 2310/0286* (2013.01)

(58) Field of Classification Search
CPC .................... G09G 3/14; G09G 2310/0286
See application file for complete search history.

(56) References Cited

U.S. PATENT DOCUMENTS

| | | | | |
|---|---|---|---|---|
| 2010/0001941 | A1* | 1/2010 | Shin | G09G 3/3677 345/98 |
| 2013/0147773 | A1* | 6/2013 | Jin | G09G 3/3266 345/204 |

(Continued)

FOREIGN PATENT DOCUMENTS

| | | |
|---|---|---|
| CN | 107393907 A | 11/2017 |
| CN | 107644614 A | 1/2018 |
| CN | 107861302 A | 3/2018 |

OTHER PUBLICATIONS

CN Office Action related to CN 201811258683.5 reported on Dec. 15, 2020.

*Primary Examiner* — Kwang-Su Yang
(74) *Attorney, Agent, or Firm* — von Briesen & Roper, s.c.

(57) ABSTRACT

Provided are a display panel and a display device. The display panel includes a display area and a non-display area surrounding the display area, the display area includes a first rectangular area and a first special-shaped area disposed adjacent to the first rectangular area, and the non-display area includes a second rectangular area adjacent to the first rectangular area and a second special-shaped area adjacent to the first special-shaped area. The display area includes pixel units arranged in an array, and a plurality of shift registers are disposed in the second rectangular area and the second special-shaped area, where each of the plurality of shift registers is connected to a row of pixel units. The second special-shaped area includes a laser cutting affected area, where none of the plurality of shift registers is disposed in at least part of the laser cutting affected area.

18 Claims, 9 Drawing Sheets

(56) References Cited

U.S. PATENT DOCUMENTS

2016/0203782 A1* 7/2016 Xie .................. G02F 1/1362
377/64
2017/0322446 A1* 11/2017 Tae .................. G02F 1/133345

* cited by examiner

DISPLAY PANEL HAVING SPECIAL-SHAPED AREA AND DISPLAY DEVICE

CROSS-REFERENCE TO RELATED APPLICATIONS

This application is a continuation of and claims benefit of priority to U.S. non-Provisional application Ser. No. 16/589,644 titled "DISPLAY PANEL AND DISPLAY DEVICE" and filed on Oct. 1, 2019, which claims priority to Chinese patent application No. 201811258683.5 filed on Oct. 26, 2018, the disclosure of which is incorporated herein by reference in its entirety.

TECHNICAL FIELD

The present disclosure relates to display technologies, and in particular relates to a display panel and a display device.

BACKGROUND

With the development of electronic technologies, a display device, as one window for the interactions between users and electronic devices, has attracted much attention. In a related art, the core component of the display device is a display panel, and the display panel includes a display area and a non-display area surrounding the display area. The display area is generally a regular rectangle with a plurality of parallel scanning lines. In the extension direction of the plurality of scanning lines, a scanning drive circuit including cascaded shift registers may be disposed on each side of the display area in the non-display area. Each shift register is electrically connected to one scanning line and configured to supply a scanning drive signal to the scanning line.

Due to diverse user requirements, the display device may be configured in various shapes, for example, circular, oval, or irregular shapes, and the display panel is also designed in the corresponding shape to increase the proportion of the display screen. Generally, laser cutting may be used to machine regular rectangles into irregular patterns. However, a certain range of laser cutting affected area will emerge during the laser cutting. In the laser cutting affected area, the performance of the shift registers may be affected so that the display panel performs an abnormal display or has a reliability problem.

SUMMARY

The present disclosure provides a display panel and a display device to reduce influence of laser cutting on performance of shift registers, thereby facilitating a normal display of the display panel and improving reliability of the display panel.

In a first aspect, an embodiment of the present disclosure provides a display panel. The display panel includes a display area and a non-display area surrounding the display area. The display area includes a first rectangular area and a first special-shaped area disposed adjacent to the first rectangular area. The non-display area includes a second rectangular area adjacent to the first rectangular area and a second special-shaped area adjacent to the first special-shaped area.

The display area includes pixel units arranged in an array, and a plurality of shift registers are disposed in the second rectangular area and the second special-shaped area, where each of the plurality of shift registers is connected to a row of pixel units. The second special-shaped area includes a laser cutting affected area, where the plurality of shift registers are not disposed in at least part of the laser cutting affected area.

In a second aspect, an embodiment of the present disclosure further provides a display device. The display device includes any display panel described in the first aspect.

The display panel provided by the embodiments of the present disclosure includes the display area and the non-display area surrounding the display area. The display area includes the first rectangular area and the first special-shaped area disposed adjacent to the first rectangular area. The non-display area includes the second rectangular area adjacent to the first rectangular area and the second special-shaped area adjacent to the first special-shaped area. The display area includes the pixel units arranged in the array, and the plurality of shift registers are disposed in the second rectangular area and the second special-shaped area, where each of the plurality of shift registers is connected to the row of pixel units. The second special-shaped area includes the laser cutting affected area, and the plurality of shift registers are not disposed in at least part of the laser cutting affected area so that the influence of laser cutting in the laser cutting affected area on the performance of the shift registers can be avoided, thereby facilitating the normal display of the display panel and ensuring the reliability of the display panel.

DETAILED DESCRIPTION

Figure 1:
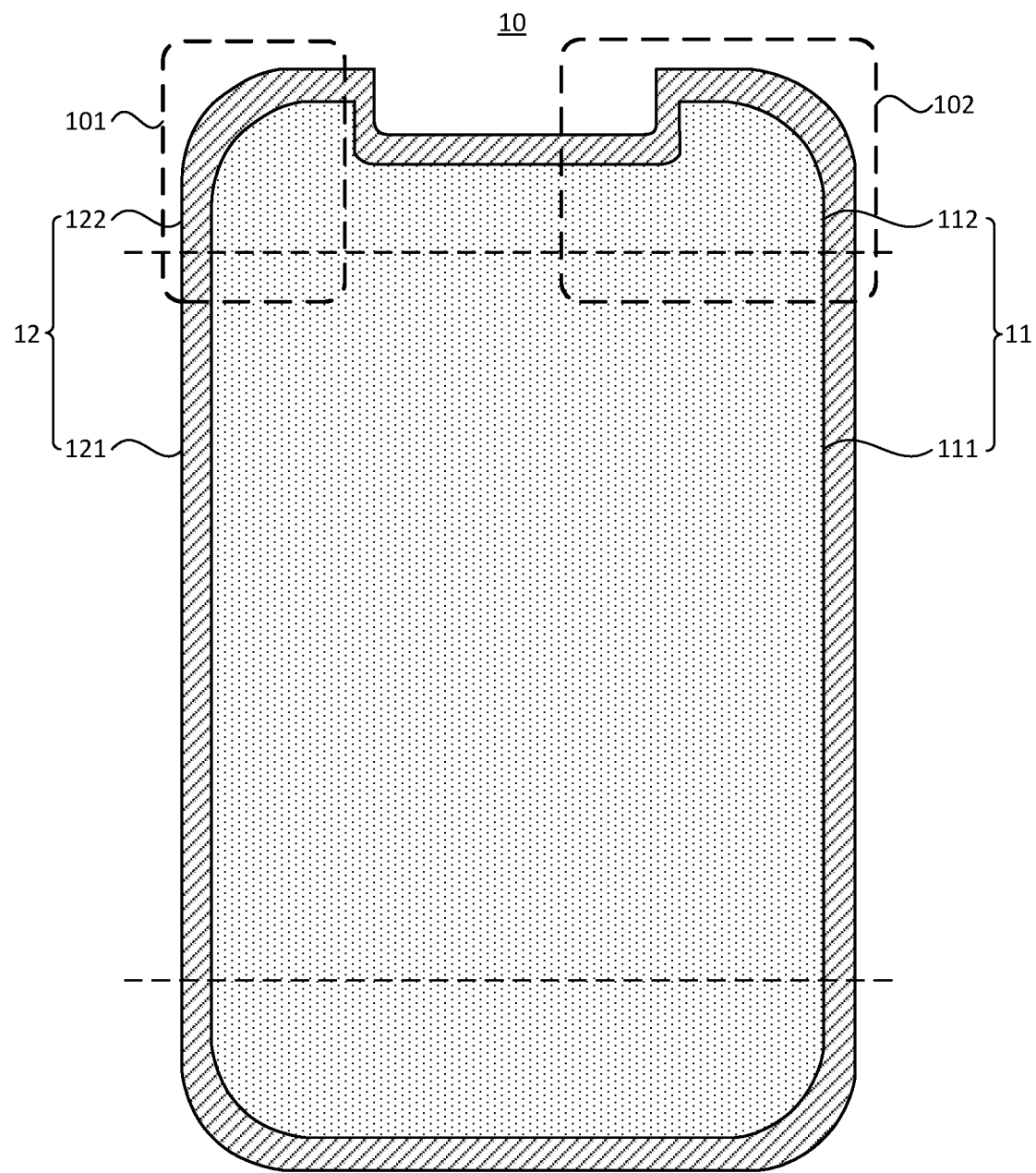
FIG. 1 is a structural diagram of a display panel according to an embodiment of the present disclosure.

Hereinafter the present disclosure will be further described in detail in conjunction with the drawings and embodiments. It is to be understood that the specific embodiments set forth below are intended to illustrate and not to limit the present disclosure. Additionally, it is to be noted that, for ease of description, only part, not all, of the structures related to the present disclosure are illustrated in the drawings.

Figure 2:
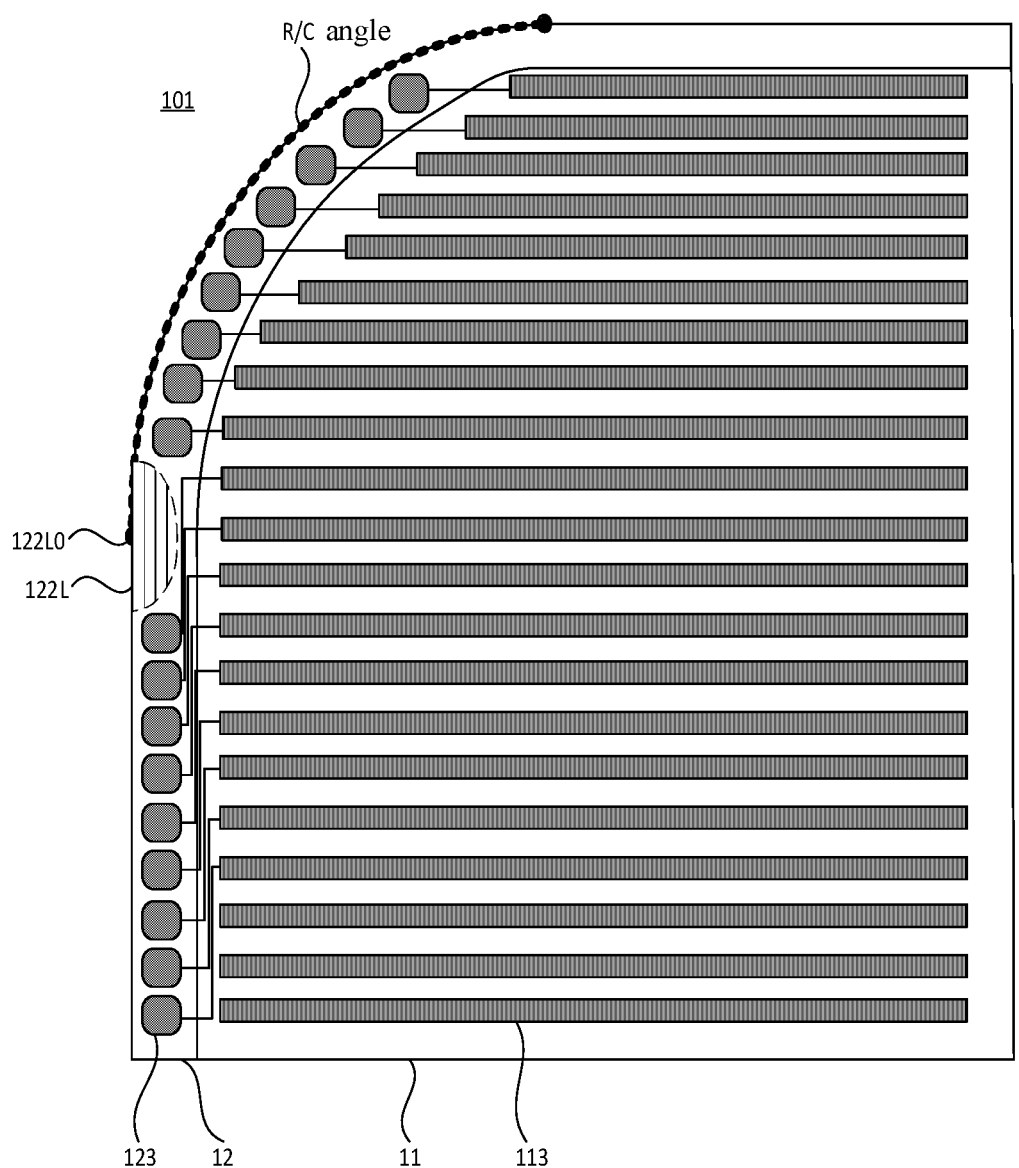
FIG. 2 is a structural diagram of an R/C corner area of the display panel shown in FIG. 1.
Figure 3:
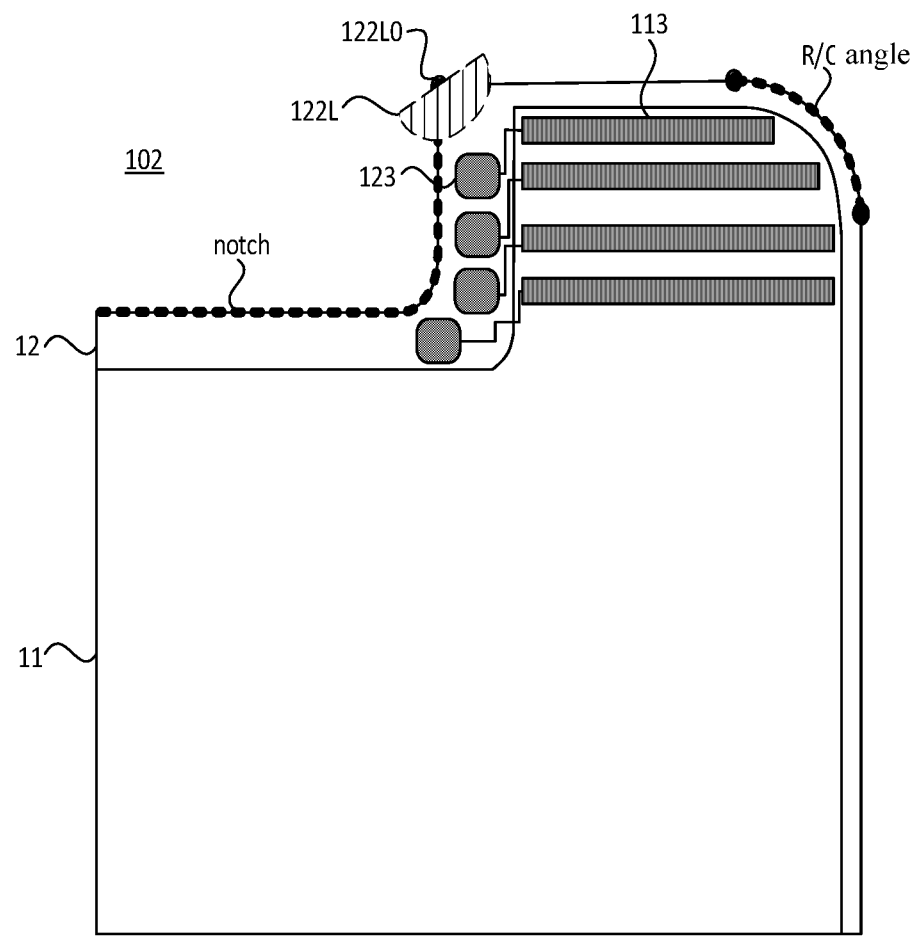
FIG. 3 is a structural diagram showing a notch area of the display panel shown in FIG. 1.

FIG. 1 is a structural diagram of a display panel according to an embodiment of the present disclosure. FIG. 2 is a structural diagram of an R/C corner area 101 of the display panel shown in FIG. 1. FIG. 3 is a structural diagram of a notch area 102 of the display panel shown in FIG. 1. Referring to FIG. 1 to FIG. 3, a display panel 10 includes a display area 11 and a non-display area 12 surrounding the display area 11. The display area 11 includes a first rectangular area 111 and a first special-shaped area 112 disposed adjacent to the rectangular area 111. The non-display area 12 includes a second rectangular area 121 adjacent to the first rectangular area 111 and a second special-shaped area 122 adjacent to the first special-shaped area 112. The display, area 11 includes pixel units arranged in an array, and a plurality of shift registers 123 are disposed in the second rectangular area 121 and the second special-shaped area 122, where each of the plurality of shift registers 123 is connected to a row of pixel units (a pixel row 113 is exemplarily illustrated as the row of pixel units in FIG. 2 and FIG. 3). The second special-shaped area 122 includes a laser cutting affected area 122L, where the plurality of shift registers 123 are not disposed in at least part of the laser cutting affected area 122L.

The display panel 10 may be a light-emitting diode display panel, a liquid crystal display panel or other types of display panels known to those skilled in the art, which is not limited in the embodiments of the present disclosure.

The pixel units arranged in the array in the display panel 10 emit light to enable the display panel 10 to display a picture. The pixel units may emit light of a red color, a green color, a blue color or other colors known to those skilled in the art, which is not limited in the embodiments of the present disclosure.

The shift register 123 may be electrically connected to the pixel units in the pixel row 113 through scanning lines (not shown) to drive pixel units row by row. Of course, it is to be understood by those skilled in the art that the shift registers 123 may be merely disposed in the non-display area 12 on a certain side of the display area 11 of the display panel 10, may be disposed in the non-display area 12 on opposite sides of the display area 11 of the display panel 10, or may be disposed in other manners. A specific connection relationship between the pixel row 113 and the shift register 123 may be determined according to the distribution of the shift registers 123, which is not limited in the embodiments of the present disclosure.

A special-shaped area (including the first special-shaped area 112 and the second special-shaped area 122) refers to an area which is not a regular rectangle. The special-shaped area may be formed by special shape cutting (cutting regular rectangles into irregular profiled patterns). The special shape cutting is generally performed in a laser cutting manner to ensure a higher cutting accuracy and a faster cutting speed, and ensure higher cutting efficiency.

Exemplarily, the special shape cutting mainly includes two aspects. In one aspect, a chamfered structure is cut at four top corners of the display panel 10 of a regular rectangle to enhance strength of the display panel 10. The chamfered structure may include a rounded corner (R corner) or a chamfered corner (C corner). It is to be understood by those skilled in the art that a radian of the R corner and an angle of the C corner may be configured according to practical requirements of the display panel, which is not limited in the embodiments of the present disclosure. In the other aspect, a notch structure is cut at the top of the display panel 10 to place a front-facing camera, a distance sensor, a sound sensor, or other elements known to those skilled in the art. The notch structure may include a V-shaped groove, a U-shaped groove, or notch structures in other shapes known to those skilled in the art, which is not limited in the embodiments of the present disclosure.

In the related art, when the special shape cutting is performed in the laser cutting manner, the sputtering of a laser beam with high energy will affect the performance of polycrystalline silicon in the shift register, thereby leading to a failure of the shift register, an abnormal display of the display panel, or reduced reliability of the display panel. If the energy of the laser beam is reduced, the sputtering of the laser beam may have less influence on the performance of the shift register, but a laser beam with low energy has low laser cutting efficiency. In the embodiments of the present disclosure, the plurality of shift registers 123 are not disposed in at least part of the laser cutting affected area 122L, so that the influence of the laser cutting in the laser cutting affected area on the performance of the shift register 123 can be avoided, thereby facilitating a normal display of the display panel 10 and ensuring reliability of the display panel 10. Meanwhile, the higher laser cutting efficiency may be ensured when the energy of the laser beam is not reduced.

The plurality of shift registers 123 are not disposed in at least part of the laser cutting affected area 122L may be understood as a downward dodge of the shift register 123. Exemplarily, the R/C corner area of the display panel in FIG. 2 or the notch area of the display panel in FIG. 3 is described as an example. No shift registers 123 are disposed at the corresponding position of the laser cutting affected area 122L, and the shift register 123 electrically connected to the pixel row 113 corresponding to the position dodges downwards from the laser cutting affected area 122L, that is, the shift register 123 is disposed at other positions adjacent to the laser cutting affected area 122L of the non-display area 12 (including the second rectangular area 121 and the second special-shaped area 122). It may also be understood as an absence of the shift register 123 in a blank area between two adjacent shift registers 123, which corresponds to the laser cutting affected area 122L. In this way, even if laser sputtering affects the blank area, the laser sputtering has no influence on the performance of the shift register 123 because of the absence of the shift register 123 in the blank area, so that the influence of the laser sputtering on the performance of the shift register 123 may be avoided, thereby facilitating the normal display of the display panel 10 and ensuring the reliability of the display panel 10.

Exemplarily, a width of the blank area in a column direction may be at least greater than a width of one shift register 123 in the column direction.

It should be noted that FIG. 2 and FIG. 3 only exemplarily illustrate the downward dodge of the shift register 123, which is not to limit the display panel 10 in the embodiments of the present disclosure. In other embodiments, an upward dodge of the shift register 123 may also be provided according to the practical requirements of the display panel 10, or other dodge manners known to those skilled in the art are employed, which is not limited in the embodiments of the present disclosure.

Optionally, referring to FIG. 2 and FIG. 3, the laser cutting affected area 122L includes a laser entry affected area and a laser exit affected area.

A special-shaped profile of the special-shaped area may be formed in the laser cutting manner. An affected area in a laser cutting process may include the laser entry affected area, a laser cutting process affected area, and the laser exit affected area. The laser entry affected area may be understood as an arcuate area with a certain radius and with a laser entry point 122L0 as a center. The laser exit affected area may be understood as an arcuate area with a certain radius and with a laser exit point (which is not shown in the figures and may be understood with reference to the laser entry point) as a center. The laser cutting process affected area is an area corresponding to the special-shaped profile between the laser entry affected area and the laser exit affected area.

The laser entry affected area and the laser exit affected area are greatly affected by the laser sputtering, while the laser cutting process affected area is less affected by the laser sputtering. Therefore, the absence of the shift register 123 in the laser entry affected area and the laser exit affected area may avoid the influence of the laser sputtering on the performance of the shift register 123, thereby facilitating the normal display of the display panel 10 and ensuring the reliability of the display panel 10. It should be noted that only the laser entry affected area and the laser exit affected area which are semi-circular areas with a certain radius are exemplarily illustrated above, which is not to limit the embodiments of the present disclosure. It is to be understood by those skilled in the art that the shapes of the laser entry affected area and the laser exit affected area are also related to a property of a film layer being cut in the display panel and a cutting process. The shapes of the laser entry affected area and the laser exit affected area are not limited in the embodiments of the present disclosure.

Figure 4:
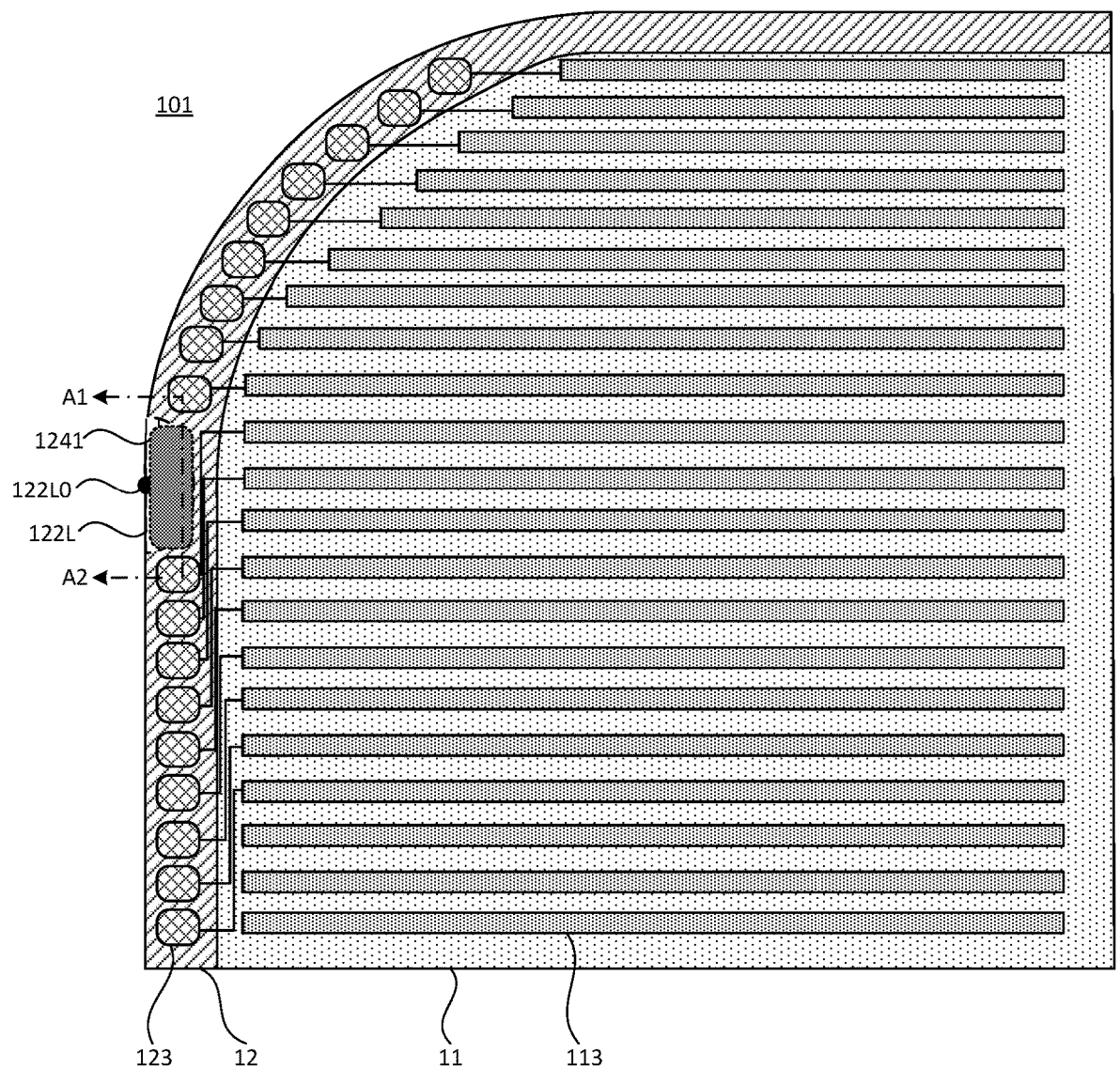
FIG. 4 is a structural diagram of another display panel according to an embodiment of the present disclosure.

Optionally, FIG. 4 is a structural diagram of another display panel according to an embodiment of the present disclosure. Referring to FIG. 4, a polycrystalline silicon absorber layer 1241 is disposed in the at least part of the laser cutting affected area 122L in which the plurality of shift registers 123 are not disposed.

The polycrystalline silicon absorber layer 1241 may be configured to absorb laser sputtering energy. Such a configuration may reduce the influence of the laser sputtering energy on the performance of the shift registers 123 adjacent to the laser cutting affected area 122L, thereby facilitating the normal display of the display panel 10 and ensuring the reliability of the display panel 10. It should be noted that FIG. 4 merely exemplarily illustrates a film position of the polycrystalline absorber layer 1241 on a plane where the display panel 10 is located, and a specific internal structure of the polycrystalline absorber layer 1241 is described in detail below.

Figure 5:
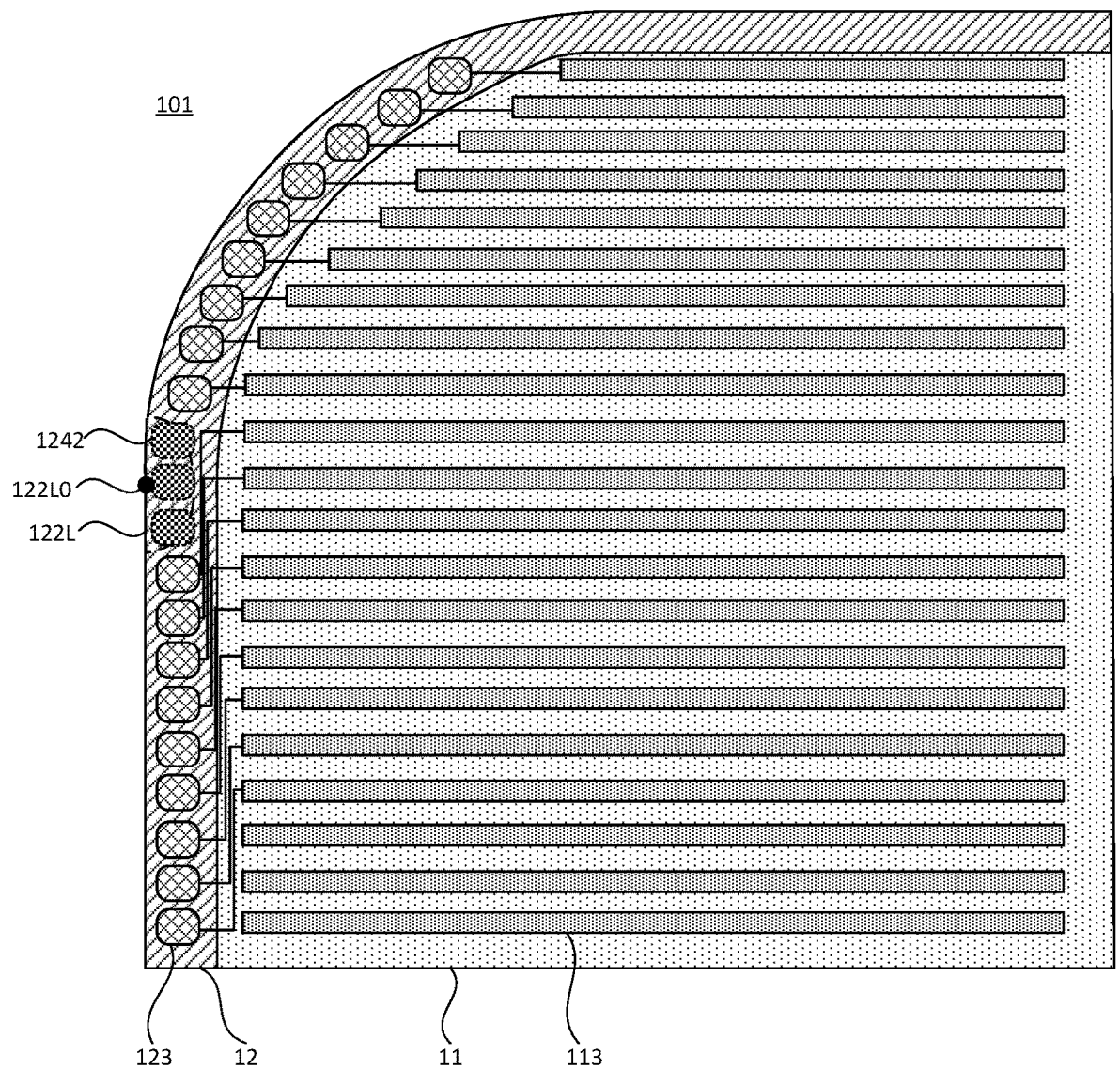
FIG. 5 is a structural diagram of another display panel according to an embodiment of the present disclosure.

Optionally, FIG. 5 is a structural diagram of yet another display panel according to an embodiment of the present disclosure. Referring to FIG. 5, virtual shift registers 1242 are disposed in the at least part of the laser cutting affected area 122L in which the plurality of shift registers 123 are not disposed, where the virtual shift registers 1242 are not connected to the pixel units.

Since the virtual shift registers 1242 are not connected to the pixel units, even if the performance of the virtual shift register 1242 is affected by the laser sputtering, the display panel 10 may perform the normal display and has unaffected reliability because the performance of the virtual shift register 1242 does not affect light emission of the pixel units.

In addition, a film layer structure of the virtual shift register 1242 is similar to a film layer structure of the shift register 123 (detailed below). In this way, a thickness difference between the laser cutting affected area 122L and other areas of the non-display area 12 may be reduced so that an overall film layer of the display panel 10 has better flatness. On the other hand, the same film layer in the virtual shift register 1242 and the shift register 123 may be made in the same process. Moreover, for a mask exposure process, a pattern density on a mask plate used in the process may remain consistent at each position of the mask plate by disposing the virtual shift register 1242, thereby ensuring that a film layer at an exposure edge has consistent characteristic dimension and avoiding the problem of poor uniformity of the film layer at the exposure edge.

It should be noted that FIG. 5 merely exemplarily illustrates three virtual shift registers 1242, which is not to limit the display panel 10 in the embodiments of the present disclosure. In other embodiments, a number of virtual shift registers 1242 may be set according to the practical requirements of the display panel 10, which is not limited in the embodiments of the present disclosure.

Figure 6:
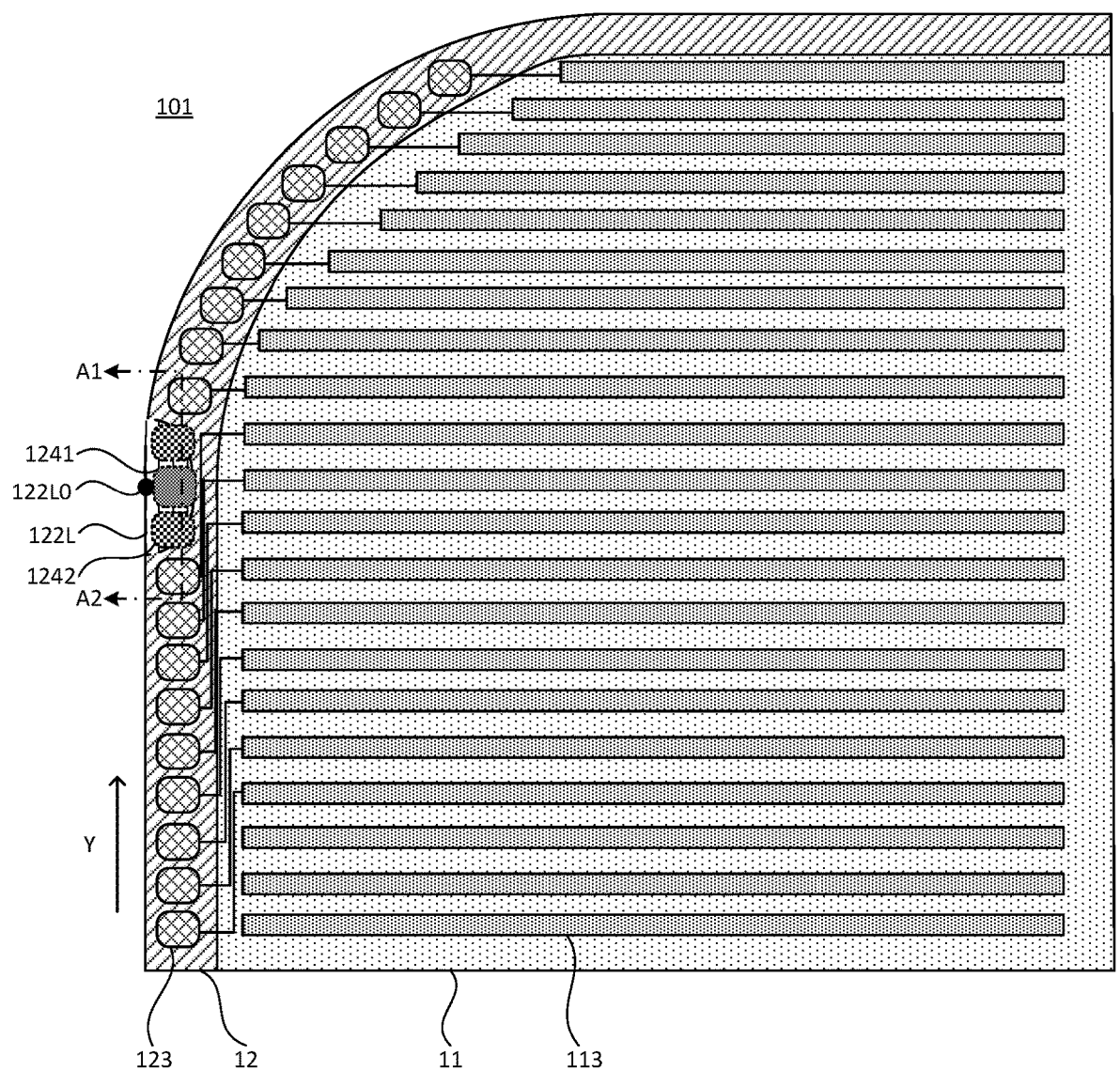
FIG. 6 is a structural diagram of another display panel according to an embodiment of the present disclosure.

Optionally, FIG. 6 is a structural diagram of another display panel according to an embodiment of the present disclosure. Referring to FIG. 6, the laser cutting affected area 122L in which the plurality of shift registers 123 are not disposed includes a first area, a second area and a third area which are sequentially arranged along a column direction Y of the array. A virtual shift register 1242 is separately disposed in the first area and the third area, where the virtual shift register 1242 is not connected to the pixel units, and a polycrystalline silicon absorber layer 1241 is disposed in the second area.

The polycrystalline silicon absorber layer 1241 may be configured to absorb part of the laser sputtering energy. The virtual shift register 1242 may alleviate the problem of poor uniformity of the film layer at the exposure edge, thereby ensuring that the performance of the shift registers 123 abutting against the virtual shift registers 1242 is consistent with the performance of the shift registers 123 disposed at other positions, thereby facilitating the normal display of the display panel 10 and ensuring the reliability of the display panel 10.

It should be noted that FIG. 6 merely exemplarily illustrates one virtual shift register 1242 separately disposed in the first area and the third area, which is not to limit the display panel 10 in the embodiments of the present disclosure. In other embodiments, a number of virtual shift registers 1242 in the first area and the third area may be set according to the practical requirements of the display panel 10, and the first area and the third area may have a same number of virtual shift registers 1242 or different numbers of virtual shift registers 1242, which is not limited in the embodiments of the present disclosure.

Figure 7:
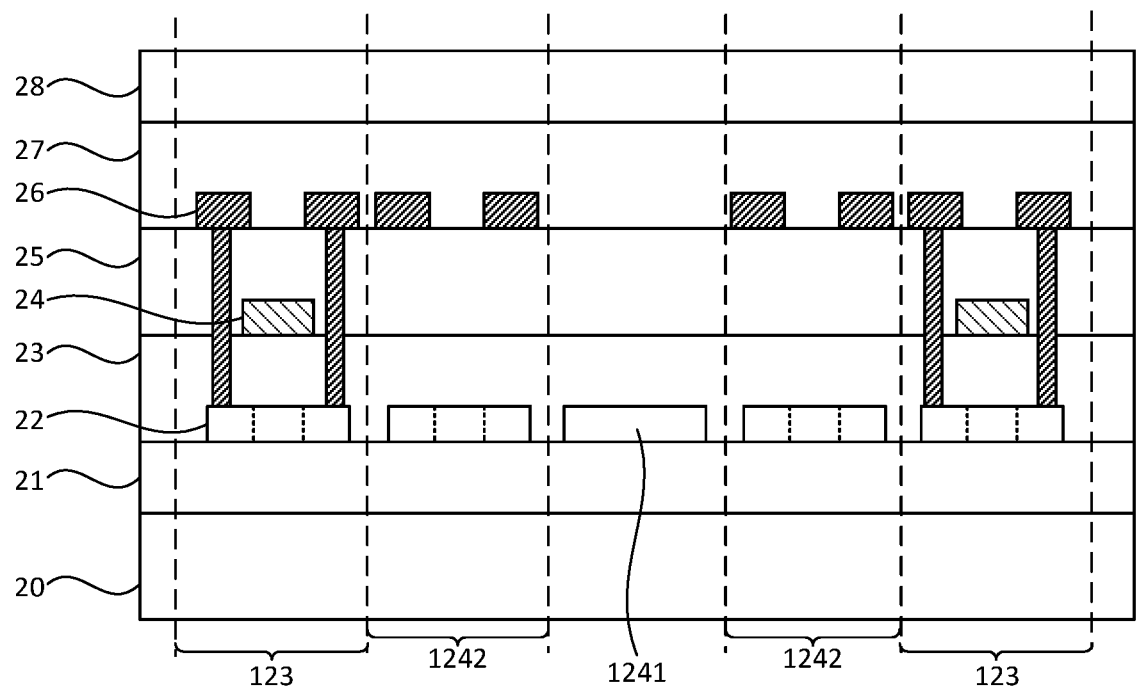
FIG. 7 is a cross sectional view taken along a line A1-A2 shown in FIG. 6.

Optionally, FIG. 7 is a cross sectional view taken along a line A1-A2 shown in FIG. 6. Referring to FIG. 7, the shift register 123 includes a polycrystalline silicon layer 22, where the polycrystalline silicon layer 22 of the shift register and the polycrystalline absorber layer 1241 are made of the same material in the same process.

In such a configuration, processes may not be increased and new materials may not be introduced.

Figure 8:
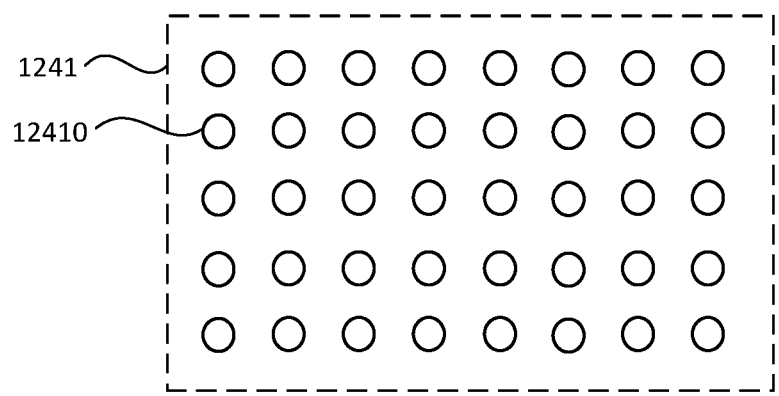
FIG. 8 is a structural diagram of a polycrystalline silicon absorber layer of a display panel according to an embodiment of the present disclosure.

Optionally, FIG. 8 is a structural diagram of a polycrystalline silicon absorber layer of a display panel according to an embodiment of the present disclosure. Referring to FIG. 8, the polycrystalline silicon absorber layer 1241 includes polycrystalline silicon blocks 12410 arranged in an array.

In such a configuration, while the laser sputtering energy is absorbed by the polycrystalline silicon absorber layer 1241, the accumulation of static electricity on the polycrystalline silicon absorber layer 1241 is avoided, thereby avoiding the influence of electrostatic discharge on the normal display and reliability of the display panel 10.

It should be noted that FIG. 8 merely exemplarily illustrates polycrystalline silicon blocks 12410 in eight columns and five rows, which is not to limit the polycrystalline absorber layer 1241 of the display panel 10 in the embodiments of the present disclosure. In other embodiments, a number of polycrystalline silicon blocks 12410 and an array arrangement of the polycrystalline silicon blocks 12410 may be set according to the practical requirements of the display panel 10, which is not limited in the embodiments of the present disclosure.

Optionally, with continued reference to FIG. 8, the polycrystalline silicon block 12410 is circular in shape in a plane parallel to the plane where the display panel 10 is located.

Such a configuration may smooth profile edges of the polycrystalline silicon blocks 12410 and avoid the influence of point discharge on display performance of the display panel 10, thereby facilitating the normal display of the display panel 10 and ensuring the reliability of the display panel 10.

Optionally, still referring to FIG. 7, the shift register 123 further includes a first insulating layer 23, a first metal layer 24, a second insulating layer 25 and a second metal layer 26 which are sequentially stacked on one side of the polycrystalline silicon layer 22 facing away from a base substrate 20. The first metal layer 24 includes a gate, the second metal layer 26 includes a source and a drain, and the source and the drain of the second metal layer 26 are electrically connected to a source area and a drain area of the polycrystalline silicon layer 22 respectively by via holes which penetrate through the first insulating layer 23 and the second insulating layer 25. The virtual shift register 1242 includes the polycrystalline silicon layer 22, the first insulating layer 23, the second insulating layer 25 and the second metal layer 26 which are sequentially stacked on one side of the base substrate 20, where via holes are included in neither the first insulating layer 23 nor the second insulating layer 25 of the virtual shift register 1242.

The virtual shift register 1242 does not include the first metal layer 24, so that charge accumulation on the first metal layer 24 may be prevented, thereby avoiding the influence of electrostatic discharge of the first metal layer 24 on the normal display and reliability of the display panel 10.

Meanwhile, the via hole is included in neither the first insulating layer 23 nor the second insulating layer 25 of the virtual shift register 1242, so that electrical connection lines are not formed in the first insulating layer 23 and the second insulating layer 25 at the corresponding position of the virtual shift register 1242, thereby avoiding the charge accumulation due to the electrical connection lines and avoid the influence of electrostatic discharge when the electrical connection lines exist on a display function and the reliability of the display panel 10.

In addition, a difference between the film layer structure of the virtual shift register 1242 and the film layer structure of the shift register 123 shown in FIG. 7 lies in that the virtual shift register 1242 does not include the first metal layer 24. Therefore, a thickness of a film layer of the virtual shift register 1242 approximates that of a film layer of the shift register 123, so that the display panel 10 has better global flatness.

Figure 9:
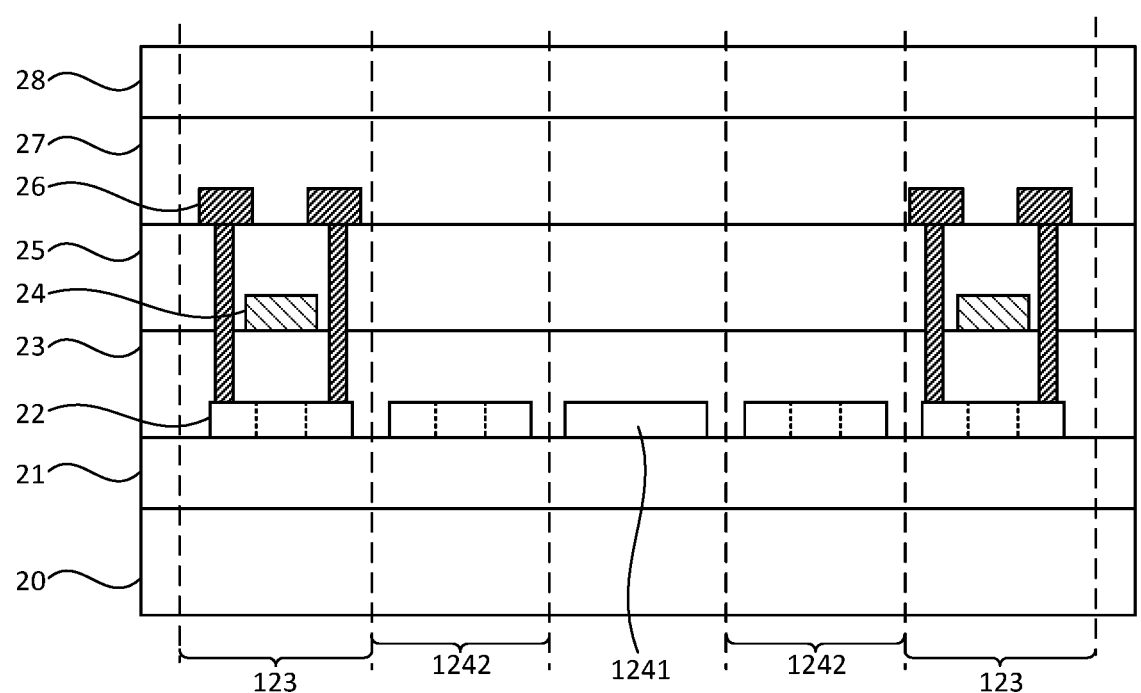
FIG. 9 is a cross sectional view of another array substrate according to an embodiment of the present disclosure.

Optionally, FIG. 9 is a cross sectional structural view of another array substrate according to an embodiment of the present disclosure. Referring to FIG. 9, the shift register 123 further includes the first insulating layer 23, the first metal layer 24, the second insulating layer 25 and the second metal layer 26 which are sequentially stacked on one side of the polycrystalline silicon layer 22 facing away from the base substrate 20. The first metal layer 24 includes the gate, the second metal layer 26 includes the source and the drain, the source and the drain of the second metal layer 26 are electrically connected to the source area and the drain area of the polycrystalline silicon layer 22 respectively by via holes which penetrate through the first insulating layer 23 and the second insulating layer 25. The virtual shift register 1242 includes the polycrystalline silicon layer 22, the first insulating layer 23 and the second insulating layer 25 which are sequentially stacked on one side of the base substrate 20, where the via holes are included in neither the first insulating layer 23 nor the second insulating layer 25 of the virtual shift register 1242.

The virtual shift register 1242 includes neither the first metal layer 24 nor the second metal layer 26, so that charge accumulation on the first metal layer 24 and the second metal layer 26 may be prevented, thereby avoiding the influence of electrostatic discharge of the first metal layer 24 and the second metal layer 26 on the display function and reliability of the display panel 10.

It should be noted that the polycrystalline silicon layer 22 in the virtual shift register 1242 and the polycrystalline silicon absorber layer 1241 shown in FIG. 9 have different planar shapes. Specifically, in the mask exposure process, the polycrystalline silicon layer 22 in the virtual shift register 1242 and the polycrystalline silicon layer 22 in the shift register 123 may be exposed using the same mask pattern. Thus, in the mask exposure process, a mask pattern density at a position adjacent to the shift register 123 is the same as a mask pattern density at a position corresponding to the shift register 123, so that a film layer at an exposure edge of the polycrystalline silicon layer 22 of the shift register 123 has the same uniformity as a film layer at an exposure edge of the polycrystalline silicon layer 22 of the shift register 123 at another position, thereby ensuring that the performance of the shift register 123 is consistent with the performance of the shift register 123 at another position and facilitating the normal display of the display panel 10.

Exemplarily, with continued reference to FIG. 7 or FIG. 9, the shift register 123 and the virtual shift register 1242 may further include a first passivation layer 21, a planarization layer 27, and a second passivation layer 28. The first passivation layer 21 is disposed on one side of the polycrystalline silicon layer 22 (the polycrystalline silicon absorber layer 1241) close to the base substrate 20. The planarization layer 27 is disposed on one side of the second metal layer 26 facing away from the base substrate 20. The second passivation layer 28 is disposed on one side of the planarization layer 27 facing away from the base substrate 20. The first passivation layer 21, the planarization layer 27, and the second passivation layer 28 may be made of materials known to those skilled in the art and in manners known to those skilled in the art, which are not repeated and limited in the embodiments of the present disclosure.

An embodiment of the present disclosure further provides a display device.

Figure 10:
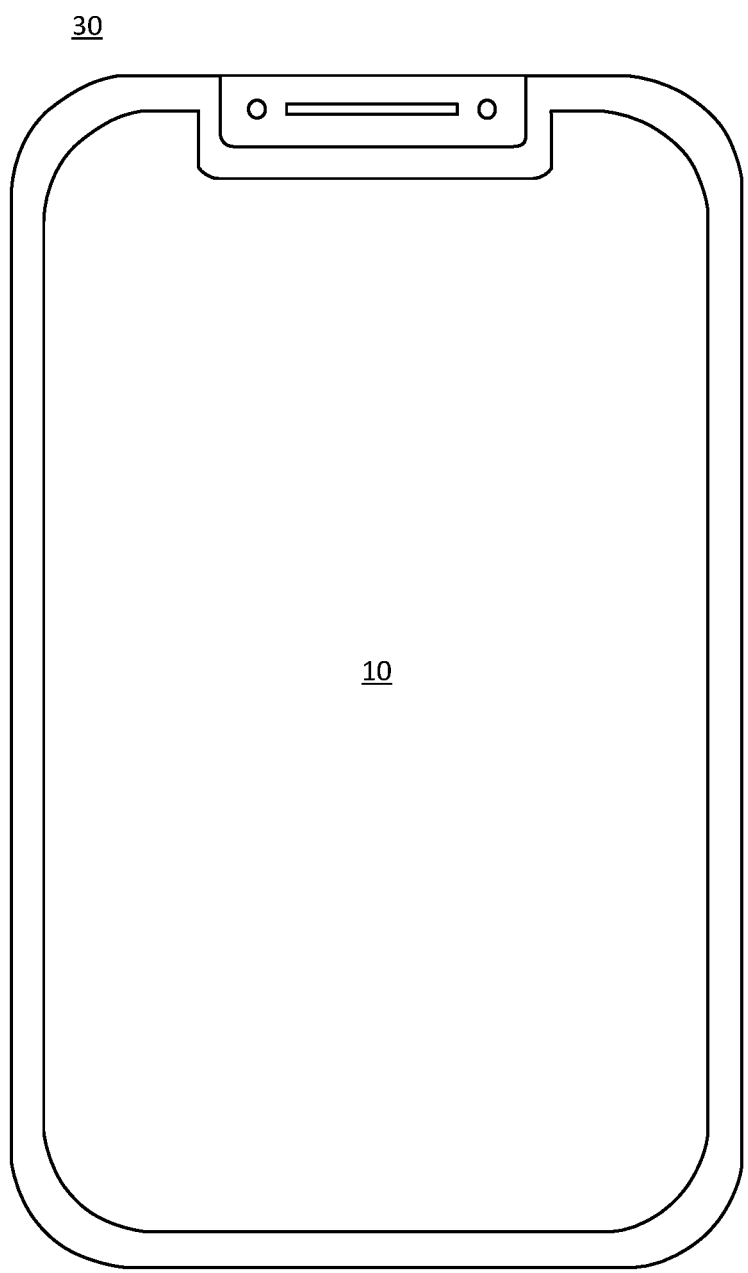
FIG. 10 is a structural diagram of a display device according to an embodiment of the present disclosure.

Exemplarily, FIG. 10 is a structural diagram of a display device according to an embodiment of the present disclosure. Referring to FIG. 10, a display device 30 includes the display panel 10 according to the embodiments described above.

The display device 30 according to the embodiment of the present disclosure includes the display panel 10 in the embodiments described above. Therefore, the display device 30 according to the embodiment of the present disclosure also has the beneficial effects described in the above embodiments, and details are not repeated herein. Exemplarily, the display device 30 may include a mobile phone, a computer, a smart wearable device and the like, which is not limited in the embodiments of the present disclosure.

It is to be noted that the above are merely preferred embodiments of the present disclosure and the technical principles used therein. It will be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A display panel, comprising: a display area; and a non-display area surrounding the display area, wherein the display area comprises a first rectangular area and a first special-shaped area disposed adjacent to the first rectangular area, and the non-display area comprises a second rectangular area adjacent to the first rectangular area and a second special-shaped area adjacent to the first special-shaped area,
wherein the display area comprises pixel units arranged in an array, and a plurality of shift registers are configured both in the second rectangular area and the second special-shaped area, wherein each of the plurality of shift registers is connected to a row of pixel units,
wherein the second special-shaped area comprises a laser cutting affected area, the laser cutting affected area comprises a laser entry affected area and a laser exit affected area, and the plurality of shift registers are not configured in at least part of the laser entry affected area and/or the laser exit affected area, and
wherein a width of the laser entry affected area and/or the laser exit affected area in which the plurality of shift registers are not configured in a column direction along the array is greater than a width of one of the plurality of shift registers along the column direction.

2. The display panel of claim 1, wherein the non-display area comprises a special-shaped profile configured corresponding to the second special-shaped area, and at least a portion of the laser cutting affected area overlaps with the special-shaped profile in along a light going direction of the display panel.

3. The display panel of claim 1, further comprising: a laser entry point; and a laser exit point, wherein the laser entry point is configured as a center of a circle of the laser entry affected area, and the laser exit point is configured as a center of a circle of the laser exit affected area.

4. The display panel of claim 3, wherein R denotes a radius of the laser entry affected area, r denotes a radius of the laser exit affected area, D denotes a distance between two points having a maximum distance in the second special-shaped area, and D>R+r.

5. The display panel of claim 1, wherein the laser entry affected area and the laser exit affected area are disposed at two ends of the laser cutting affected area facing to the second rectangular area.

6. The display panel of claim 1, wherein a polycrystalline silicon absorber layer is configured in at least part of the laser entry affected area and/or the laser exit affected area where the plurality of shift registers are not configured.

7. The display panel of claim 6, wherein the each of the plurality of shift registers comprises a polycrystalline silicon layer, and wherein the polycrystalline silicon layer of the each of the plurality of shift registers and the polycrystalline silicon absorber layer are made of a same material in a same process.

8. The display panel of claim 7, wherein the polycrystalline silicon absorber layer comprises polycrystalline silicon blocks arranged in an array.

9. The display panel of claim 8, wherein an orthographic projection of each of the polycrystalline silicon blocks on a plane, and wherein a light outgoing plane of the display panel is located has a circular shape.

10. The display panel of claim 1, wherein virtual shift registers are disposed in the at least part of the laser entry affected area and/or the laser exit affected area where the plurality of shift registers are not configured, and the virtual shift registers are not connected to the pixel units.

11. The display panel of claim 10, wherein:
each of the plurality of shift registers further comprises a first insulating layer, a first metal layer, a second insulating layer and a second metal layer which are sequentially stacked on one side of a polycrystalline silicon layer facing away from a base substrate, wherein the first metal layer comprises a gate, the second metal layer comprises a source and a drain, and the source and the drain of the second metal layer are electrically connected to a source area and a drain area of the polycrystalline silicon layer respectively by via holes which penetrate through the first insulating layer and the second insulating layer; and
each of the virtual shift registers comprises the polycrystalline silicon layer, the first insulating layer, the second insulating layer and the second metal layer which are sequentially stacked on one side of the base substrate, wherein via holes are comprised in neither the first insulating layer nor the second insulating layer of the each of the virtual shift registers.

12. The display panel of claim 10, wherein:
each of the plurality of shift registers further comprises a first insulating layer, a first metal layer, a second insulating layer and a second metal layer which are sequentially stacked on one side of a polycrystalline silicon layer facing away from a base substrate, wherein the first metal layer comprises a gate, the second metal layer comprises a source and a drain which, and the source and the drain of the second metal layer are electrically connected to a source area and a drain area of the polycrystalline layer respectively by via holes which penetrate through the first insulating layer and the second insulating layer; and
each of the virtual shift registers comprises the polycrystalline silicon layer, the first insulating layer and the second insulating layer which are sequentially stacked on one side of the base substrate, wherein via holes are comprised in neither the first insulating layer nor the second insulating layer of the each of the virtual shift registers.

13. The display panel of claim 1, wherein the at least part of the laser entry affected area and/or the laser exit affected area where the plurality of shift registers are not configured comprises a first area, a second area and a third area which are sequentially arranged along a column direction of the array, and
wherein: virtual shift registers are disposed in the first area and the third area, and the virtual shift register are not connected to the pixel units; and
a polycrystalline silicon absorber layer is disposed in the second area.

14. The display panel of claim 13, wherein the each of the plurality of shift registers comprises a polycrystalline silicon layer, and wherein the polycrystalline silicon layer of the each of the plurality of shift registers and the polycrystalline silicon absorber layer are made of a same material in a same process.

15. The display panel of claim 13, wherein:
each of the plurality of shift registers further comprises a first insulating layer, a first metal layer, a second insulating layer and a second metal layer which are sequentially stacked on one side of a polycrystalline silicon layer facing away from a base substrate, wherein the first metal layer comprises a gate, the second metal layer comprises a source and a drain, and the source and the drain of the second metal layer are electrically connected to a source area and a drain area of the polycrystalline silicon layer respectively by via holes which penetrate through the first insulating layer and the second insulating layer; and each of the virtual shift registers comprises the polycrystalline silicon layer, the first insulating layer, the second insulating layer and the second metal layer which are sequentially stacked on one side of the base substrate, wherein via holes are comprised in neither the first insulating layer nor the second insulating layer of the each of the virtual shift registers.

16. The display panel of claim 13, wherein:
each of the plurality of shift registers further comprises a first insulating layer, a first metal layer, a second insulating layer and a second metal layer which are sequentially stacked on one side of a polycrystalline silicon layer facing away from a base substrate, wherein the first metal layer comprises a gate, the second metal layer comprises a source and a drain, and the source and the drain of the second metal layer are electrically connected to a source area and a drain area of the polycrystalline layer respectively by via holes which penetrate through the first insulating layer and the second insulating layer; and each of the virtual shift registers comprises the polycrystalline silicon layer, the first insulating layer and the second insulating layer which are sequentially stacked on one side of the base substrate, wherein via holes are comprised in neither the first insulating layer nor the second insulating layer of the each of the virtual shift registers.

17. The display panel of claim 1, wherein: the first special-shaped area comprises M rows of the pixel units configured corresponding to the laser entry affected area and/or the laser exit affected area; and the plurality of shift registers connected to the M rows of the pixel units are disposed in the second rectangular area and/or in an area of the second special-shaped area in Which the laser entry affected area and the laser exit affected area are not located, where M is an integer greater than one.

18. A display device, comprising a display panel, wherein the display panel comprises:
a display area; and a non-display area surrounding the display area, wherein the display area comprises a first rectangular area and a first special-shaped area disposed adjacent to the first rectangular area, and the non-display area comprises a second rectangular area adjacent to the first rectangular area and a second special-shaped area adjacent to the first special-shaped area, wherein the display area comprises pixel units arranged in an array, and a plurality of shift registers are configured both in the second rectangular area and the second special-shaped area, wherein each of the plurality of shift registers is connected to a row of pixel units, wherein the second special-shaped area comprises a laser cutting affected area, the laser cutting affected area comprises a laser entry affected area and a laser exit affected area, and the plurality of shift registers are not configured in at least part of the laser entry affected area and/or the laser exit affected area, and wherein a width of the laser entry affected area and/or the laser exit affected area in which the plurality of shift registers are not configured in a column direction along the array is greater than a width of one of the plurality of shift registers along the column direction.

\* \* \* \* \*